(12) United States Patent
Larimer (10) Patent No.: US 7,576,911 B1
(45) Date of Patent: Aug. 18, 2009

(54) VARIABLE APERTURE TRANSMISSIVE SUBSTAGE MICROSCOPE ILLUMINATOR

(76) Inventor: Roy Larimer, 374 White Oak Dr., Palmyra, VA (US) 22963

( * ) Notice: Subject to any disclaimer, the term of this patent is extended or adjusted under 35 U.S.C. 154(b) by 49 days.

(21) Appl. No.: 11/775,356

(22) Filed: Jul. 10, 2007

Related U.S. Application Data (60) Provisional application No. 60/807,018, filed on Jul. 11, 2006.

(51) Int. Cl.
*G02B 21/08* (2006.01)
(52) U.S. Cl. ...................... 359/385; 359/388
(58) Field of Classification Search ................. 359/385, 359/388, 389
See application file for complete search history.

(56) References Cited

U.S. PATENT DOCUMENTS

| | | | | |
|---|---|---|---|---|
| 3,650,597 A | * | 3/1972 | Nothnagle | 359/385 |
| 3,971,622 A | * | 7/1976 | Yoshinaga | 359/390 |
| 5,136,429 A | * | 8/1992 | Bergner et al. | 359/663 |
| 5,684,625 A | * | 11/1997 | Stankewitz et al. | 359/385 |
| 6,212,005 B1 | * | 4/2001 | Kawasaki et al. | 359/388 |
| 2003/0021035 A1 | * | 1/2003 | Kusaka et al. | 359/685 |
| 2004/0085628 A1 | * | 5/2004 | Kawasaki et al. | 359/385 |
| 2004/0105148 A1 | * | 6/2004 | Kruger et al. | 359/381 |
| 2005/0259320 A1 | * | 11/2005 | Fujimura | 359/385 |

FOREIGN PATENT DOCUMENTS

DE   3331884 A1 * 3/1985

* cited by examiner

*Primary Examiner*—Alessandro Amari
*Assistant Examiner*—Mark Consilvio
(74) *Attorney, Agent, or Firm*—Milde & Hoffberg LLP (57) ABSTRACT

A microscope illuminator system suitable for both critical source illumination and Köhler-type illumination without substantially altering the elements within the optical path. The system preferably provides a continuous range of adjustment from critical type illumination to Köhler-type illumination, and beyond. Further, the microscope illuminator system preferably employs a fiber optic illuminator providing both incandescent continuous illumination and stroboscopic illumination.

20 Claims, 7 Drawing Sheets

Figures 7A (top) and 7B (bottom)

VARIABLE APERTURE TRANSMISSIVE SUBSTAGE MICROSCOPE ILLUMINATOR

FIELD OF THE INVENTION

The present invention relates to the field of microscope illumination devices.

BACKGROUND OF THE INVENTION

An excellent discussion of Microscopes and microscope illumination systems is provided by Mortimer Abramowitz, *MICROSCOPE, Basics and Beyond* (For Olympus America Inc.), Volume 1, Revised 2003, Basics and Beyond Series, expressly incorporated herein by reference. See, also micro-.magnet.fsu.edu/primer/index.html (and linked pages), expressly incorporated herein by reference.

A microscope is an instrument designed to make fine details visible. The microscope must accomplish three tasks: produce a magnified image of the specimen (magnification), separate the details in the image (resolution), and render the details visible to the eye, camera, or other imaging device (contrast).

Essentially, this is how a microscope functions. Light from a lamp passes through a substage condenser and then through a transparent specimen placed over an opening in the stage. Light is then gathered by the objective. The objective, together with the built-in tube lens (more of this later), focuses the image of the specimen at the level of the fixed diaphragm of the eyepiece. The image is then seen by the observer as if it were at a distance of approximately 10 inches (250 millimeters) from the eye.

Systems that do not form an image of the light source at some point in the optical pathway are called afocal or nonfocused illumination. Before the invention of electric bulbs, microscopists were limited in their choice of suitable sources for microscope illumination. During daylight hours, they could point their microscopes (or substage reflector mirrors) towards the sky and use the clouds as a crude diffusion screen to spread illumination evenly across the entire field of view. Instrument makers also ground mirrors to produce concave reflective surfaces in an effort to increase the light intensity in the object plane. Clouds and blue sky are not light sources that lend themselves to being easily imaged within the optical pathway of the microscope, and thus are sources of afocal illumination. Indoor and night work forced early microscopists to rely on artificial sources of illumination which, due to the inherent lower color temperature produced by these sources, rendered specimen colors in different intensities, hues, and tones than were observed under natural daylight. To compensate for this, microscopists have used various types of blue filters to change the apparent color temperature of artificial light to closely match that of natural daylight. However, without forming an image of the light source somewhere within the optical path, these various early methods of illumination still fall into the category of afocal or nonfocused illumination.

As between daylight and artificial light sources, there are (practically speaking) no evident changes in the optical character or resolving power of the image, provided the back lens of the objective is completely filled with light. The most important requirement is that the numerical aperture of the illumination be at least equal to that of the objective. In the nineteenth century, new illumination sources were developed, and a new "source focused" (later termed critical or Nelsonian illumination) method was developed to improve microscope illumination conditions, which can produce specimen illumination that is uniformly bright and free from glare, thus allowing the user to realize the microscope's full potential.

Critical (or Nelsonian) Illumination was first developed by British microscopist Edward Nelson using optical principles advanced by Ernst Abbe. Nelsonian illumination was used very successfully by microscopists from the latter part of the nineteenth century until well into the twentieth century. Today, there are still some advocates of critical illumination who continue to use it with microscopes requiring external light sources, or with lower magnification environments. Nelsonian illumination relies on using the substage condenser to produce a focused image of the flame from a burning oil lamp (or other homogeneous light source) in the plane of the specimen to achieve a somewhat even illumination condition over the entire viewfield. Since the source is itself diffuse, it does not add structure to the image; however, inhomogeneities are directly presented in the viewed image. Homogeneity of the light source is critical when considering this method of illumination. Thus, while a flame produced by a burning lamp is fairly even and consistent, point or filament sources must diffused, leading to the use of frosted enlarger bulbs, opal bulbs, or ribbon filaments.

FIG. 1 (Image forming light path) illustrates the optical pathways of critical illumination using a hypothetical oil lamp that provides a homogeneous illumination source. Light emitted from the oil lamp flame must be focused by the substage condenser so that an image of the flame is produced in the specimen plane at the microslide. In practice, it is often difficult (or impossible) to find focus in the central portion of the flame, so the "edge" of the flame is usually focused with subsequent readjustment of the substage mirror so that the image of the central portion of the flame fills the field of view. The amount of light entering the microscope can be controlled by the field diaphragm, which (if present) is usually attached externally. Enough light must enter the microscope to completely fill the back plane of the objective, and this can be controlled through proper adjustment of the condenser aperture diaphragm. Focusing the light source in the sample plane is precarious and can often yield a grainy, uneven, or speckled background. This can be overcome by slightly defocusing the substage condenser to produce a more uniform background. Nelsonian illumination has largely been supplanted by the far more efficient Köhler method of microscope illumination.

In Köhler illumination, an image of the light source is focused at the condenser aperture diaphragm to produce parallel (and unfocused) light through the plane of the specimen or object. A magnified image of the light source below the condenser (at the aperture diaphragm) produces a wide cone of illumination that is required for optimum resolution of the specimen. The size of the condenser aperture diaphragm can be used to control the numerical aperture of the light cone that illuminates the sample and reduce unwanted stray light and glare.

Efficient sample illumination is very dependent upon proper alignment of all the optical components in the microscope, including the illumination source. Uneven illumination can have a serious impact on the quality of photomicrographs, causing "hot spots", vignetting, color fringes, poor contrast, and a variety of other undesirable effects.

In Köhler illuminated microscopes, the collector lens and other optical components built into the base of the microscope project an enlarged and focused image of the lamp filament onto the plane of the aperture diaphragm of a properly positioned substage condenser. Closing or opening the condenser diaphragm controls the angle of the light rays emerging from the condenser and reaching the specimen from all azimuths. Because the light source is not focused at the level of the specimen, the light at specimen level is essentially grainless and extended and does not suffer deterioration from dust and imperfections on the glass surfaces of the condenser. Opening and closing of the condenser aperture diaphragm controls the angle of the light cone reaching the specimen. The setting of the condenser's aperture diaphragm, along with the aperture of the objective, determines the realized numerical aperture of the microscope "system". As the condenser diaphragm is opened, the working numerical aperture of the microscope increases, resulting in greater resolving power and light transmittance. Parallel light rays that pass through and illuminate the specimen are brought to focus at the back focal plane of the objective, where the image of the variable condenser aperture diaphragm and the image of the light source will be seen in focus.

Figure 1A:
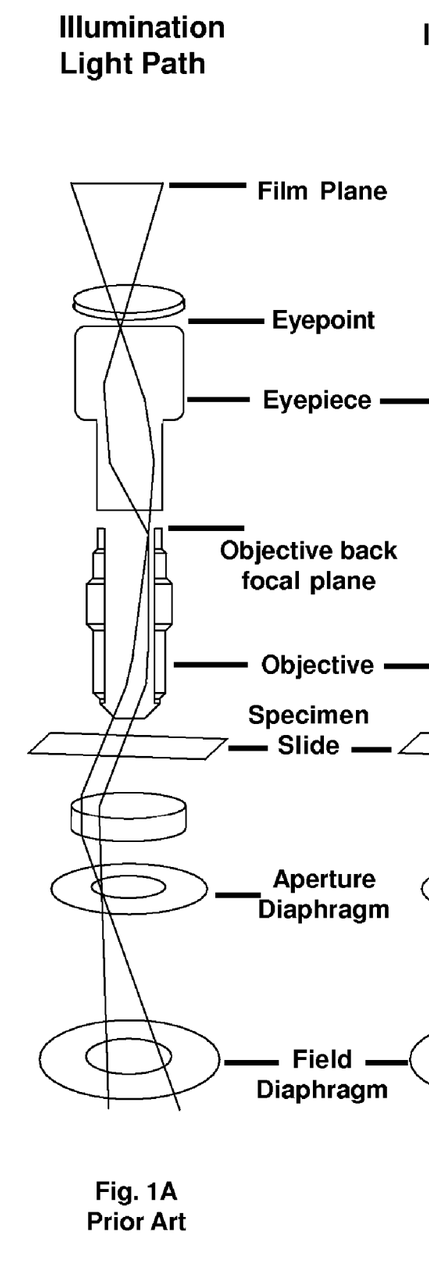
FIG. 1 shows a diagram of the illumination and subject light paths under Köhler illumination, according to the prior art.
Figure 1B:
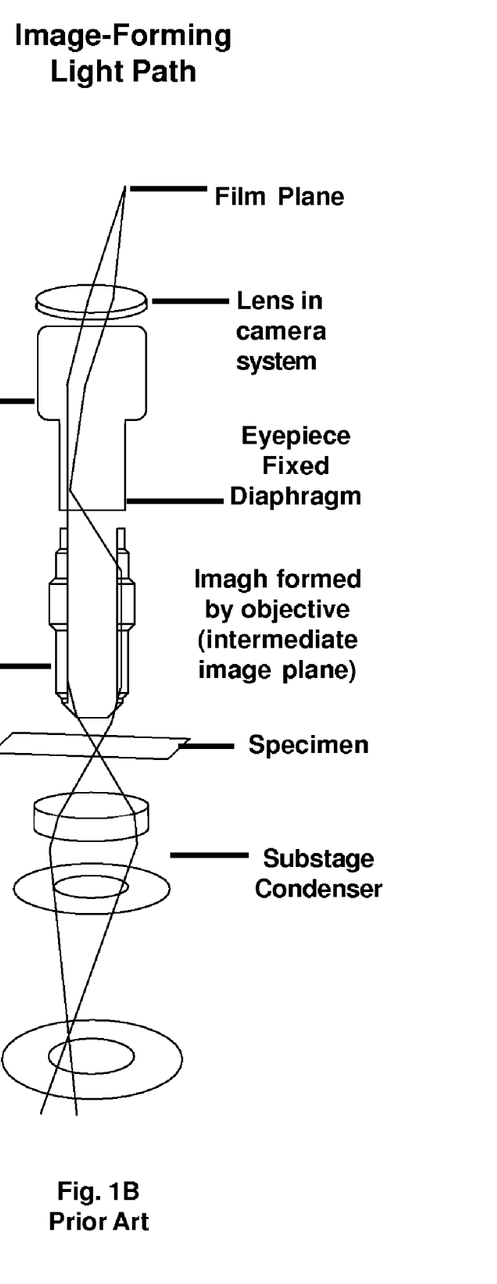

The light pathways illustrated in FIGS. 1A and 1B are schematically drawn to represent separate paths taken by the specimen illuminating light rays and the image-forming light rays. FIG. 1A shows the ray paths for illuminating light produce a focused image of the lamp filament at the plane of the substage condenser aperture diaphragm, the back focal plane of the objective, and the eye point (also called the Ramsden disk) of the eyepiece. These areas that are in common focus are often referred to as conjugate planes, which are critical in achieving proper Köhler illumination. By definition, an object that is in focus at one plane is also in focus at the other conjugate planes of that light path. In each light pathway (both image-forming and illumination), there are four separate planes that together make up the conjugate plane set.

The basic function of the substage condenser is to gather the light coming from the light source and to concentrate that light in a collection of parallel beams (from every azimuth) onto the specimen. The light gathered by the condenser comes to a focus at the back focal plane of the objective. In appropriately set up illumination, it is arranged that the image of the light source, comes to focus at the level of the built-in variable aperture diaphragm of the substage condenser (the front focal plane of the condenser). Correction for lens errors are incorporated in the finest condensers, an important feature for research and photography, but which may not be critical for other applications.

The base of the microscope typically contains a collector lens. This lens is placed in front of the light source. Its function is to project an image of the light source onto the plane of the condenser's aperture diaphragm. In some instruments a diffusion or frosted filter is placed just after the collector lens (side closer to the specimen) in order to provide more even illumination. Also in the base of the microscope, under the condenser, is a first surface mirror whose function is to reflect the light coming from the lamp up into the substage condenser to form a more compact optical path. Just before that mirror (closer to the lampside) is another variable diaphragm known as the field diaphragm. The light transmitted by the condenser then passes through the specimen on the stage, into the objective, thus illuminating the specimen. If the lamp is of high intensity (tungsten halogen), its brightness may be controlled by a built-in or separate transformer, though this also changes the color temperature. A better technique controls brightness by use of a neutral density filter, thus preserving color balance.

The condenser aperture and the proper focusing of the condenser are of critical importance in realizing the full potential of the objective in use. Likewise, the appropriate use of the adjustable aperture iris diaphragm (incorporated in the condenser or just below it) is most important in securing excellent illumination and contrast. The opening and closing of the aperture iris diaphragm controls the angle of the illuminating rays which pass through the condenser, through the specimen and into the objective.

For low power objectives (4× or below), some designs make it necessary to unscrew the top lens of the condenser or to use a condenser with a flip-top upper lens. Special low power condensers are also available. The height of the condenser is regulated by one or a pair of condenser knobs which raise or lower the condenser.

There are two important variable diaphragms: the aperture iris diaphragm of the condenser and the variable field diaphragm in the base. The aperture iris of the condenser controls the angular aperture of the cone of light traversing the condenser toward the specimen. The field diaphragm controls the area of the circle of light illuminating the specimen.

The rationale for Köhler illumination is elegant but simple. A collector lens is placed in front of the light source and is designed to project an enlarged image of the light source coming to focus at the level of the variable aperture diaphragm of the substage condenser. Since the light source is focused at the front focal plane of the condenser (approximate position of the variable condenser aperture diaphragm), the light emerging from the condenser travels through the specimen in parallel rays from every azimuth. Since the light source is not focused at the plane of the specimen, the light at the specimen plane is essentially grainless and extended. The opening and closing of the aperture diaphragm controls the angle of the light cone reaching the specimen. The parallel rays are brought to focus at the back focal plane of the objective; here the image of the variable aperture diaphragm and the image of the light source will be seen in focus.

A second variable diaphragm, called the field diaphragm, is placed in front of the collector lens, most often in the base or so-called light port of the microscope. Its function is to control the diameter (not angle) of the light bundle passing through the specimen. It is the proper setting and manipulation of the two variable diaphragms, aperture and field, which are the keys to Koehler illumination—bright, even illumination yielding the best compromise between resolution and contrast.

The light source itself should be precentered or centerable to the optical axis of the microscope. In practice, a frosted or diffusing filter is usually placed in front of the collector lens, but prior to the field diaphragm, to further ensure the evenness of the light.

In a given set of conjugate planes, what is in focus for one of the conjugate planes will also be in focus at the other conjugate planes of that set. Conjugate planes in the path of the illuminating light rays in Köhler illumination shown in FIG. 1A include: the lamp filament; the condenser aperture diaphragm (at the front focal plane of the condenser); the back focal plane of the objective; and the eye point (also called the Ramsden disk) of the eyepiece, which is located approximately one-half inch (one centimeter) above the top lens of the eyepiece, at the point where the observer places the front of the eye during observation.

Likewise, the conjugate planes in the image-forming light path in Köhler illumination, shown in FIG. 1B, include: the field diaphragm; the focused specimen; the intermediate image plane (i.e., the plane of the fixed diaphragm of the eyepiece); and the retina of the eye or the film plane of the camera.

Conjugate focal planes are often useful in troubleshooting a microscope for contaminating dust, fibers, and imperfections in the optical elements. If these artifacts are in sharp focus, it follows that they must reside on or near a surface that is part of the imaging-forming set of conjugate planes. Members of this set include the glass element at the microscope light port, the specimen, the reticle in the eyepiece, and the bottom lens element of the eyepiece. Alternatively, if these contaminants are fuzzy and out of focus, they are likely near the illuminating set of elements that share conjugate planes. Suspects in this category are the condenser top lens (where dust and dirt often accumulate), the exposed eyepiece lens element (contaminants from eyelashes), and the objective front lens (usually fingerprint smudges).

In order to set up Köhler illumination, the following steps are performed:

1. After switching on the lamp of the microscope, both the field diaphragm (in the light port of the microscope) and the aperture diaphragm (usually built into the substage condenser) are fully opened.

2. The nosepiece is rotated to bring the 10× objective into the light path. The specimen is placed on the microscope stage and focus the specimen using the coarse and fine focusing knobs.

3. The field diaphragm is closed down most of the way. The substage condenser is then raised (using the condenser focusing knob) and the image of the field diaphragm focused sharply onto the already-focused specimen. The image of the field diaphragm should appear as a focused polygon.

4. If the image of the field diaphragm is not centered in the field of view, the condenser centering screws (or knobs) are used to center the image of the field diaphragm. The field diaphragm is then opened until it just disappears from view.

5. Next, one of the eyepieces is removed and the user views down the tube of the microscope, and the aperture diaphragm of the substage condenser opened and closed, to observe its image at the back focal plane of the objective. As a rule of thumb, this diaphragm is adjusted so that it is ⅔ to ¾ open. This setting usually represents the best compromise between resolution and contrast. If there is a frosted or diffusion filter built into the light path in the base of the microscope, an evenly lighted circle of light will be seen. If there is no such filter in the light path, the image of the filament of the light bulb will be seen. (A centering or phase telescope, inserted in place of the removed eyepiece, will make this adjustment easier to see.) The eyepiece is then replaced.

6. Koehler illumination with the 10× objective is thereby set up. To switch to a higher power objective, BOTH the field and the aperture diaphragms must be adjusted. For example, with the 40× objective, the field diaphragm must be closed somewhat and recentered. The condenser aperture diaphragm is opened somewhat (the 40× objective has a higher numerical aperture—light-grasping ability—than does the 10× objective). Thus, every time objectives are changed, both diaphragms must be adjusted in accordance with the steps given above.

The condenser aperture iris diaphragm may have a calibrated scale which tells the utilized numerical aperture of the condenser. The use of this scale makes it easy to repeat a desired setting related to the numerical aperture of the objective being employed. For example, if you want to have a setting of 80% of the objective being filled with light and the numerical aperture of the objective is 0.25, the iris aperture diaphragm of the condenser is set at 0.20. 0.20 is 80% of 0.25.

Köhler illumination provides a specimen which is well-illuminated with even, glare-free light, giving good image contrast.

Once Köhler illumination is set up, the brightness should not be adjusted by lowering the condenser position or by closing the iris aperture diaphragm. The intensity of the lamp is best adjusted by using neutral density filters (reduce brightness without affecting color temperature of the light source) or, if you are not doing image recording, adjusting the voltage by means of the built in transformer lever or knob.

When light from the various points of a specimen passes through the objective and is reconstituted as the image, the various points of the specimen appear in the image as small disks (not points) known as Airy disks. This phenomenon is caused by diffraction or scattering of light as it passes through the minute parts and spaces in the specimen and the circular back of the objective The Airy disks, at the plane of the image, consist of small concentric light and dark circles. The smaller the Airy disks projected by the objective in forming the image, the finer the detail of the specimen discernible because the disks are less likely to overlap one another.

Objectives of better correction and higher numerical aperture produce smaller Airy disks than objectives of lesser correction and lower numerical aperture. The ability to distinguish (separate) clearly minute details lying close together in the specimen is known as resolving power. The phenomenon of diffraction and the limiting effect of the size of light waves dictate the "rule of thumb", that the useful magnification of an objective is 500-1000× the numerical aperture of the objective.

The ability of an objective to include or "grasp" the various rays of light coming from each illuminated part of the specimen is directly related to the angular aperture of the objective. Objectives with lower angular aperture can include only a narrower cone of light as compared to objectives with higher angular aperture. The equation for numerical aperture (N.A.) is: N.A.=n sine $\mu$ In this equation N.A. is the numerical aperture; n is the index of refraction of the material in the object space, that is the space between the specimen and the front (lowest) lens of the objective. Sine $\mu$ is the sine of ½ the angular aperture of the objective. The refractive index of air is 1.00+. Since $\mu$ cannot exceed 90°, the sine of $\mu$ must be 1 or less. Since a "dry" objective is used with air in the object space (n for air is 1.00+), the maximum theoretical N.A. of a "dry" objective is 1; in practice, not more than 0.95. Increasing the angular aperture of an objective increases $\mu$ and thus increases sine $\mu$ and thus increases numerical aperture.

Resolving power has been defined as the ability of an objective to separate clearly two points or details lying close together in the specimen. Resolution has been defined as the actual (rather than theoretical) separation distance of two details lying close together still seen as separate. N.A. of system=(N.A of the objective+N.A. of the condenser)/2. The equation for resolution for non-luminous objects (according to Abbe) is: $r=1.22\lambda(2N.A.)=0.61\lambda/N.A.$ In this equation, r=the size of the distance between two minute points lying close together in the specimen but still showing the points as separate; $\lambda$ is the wavelength of light being used; N.A. is the numerical aperture of the objective. As N.A. increases, r becomes smaller; the size of the distance between adjacent points becomes smaller; hence resolution is better. Resolution varies inversely with numerical aperture. Higher N.A. objectives are capable of yielding the best resolution; hence better for separating very minute details.

The numerical aperture of the entire microscope system depends on the N.A. of the substage condenser and the objective working together.

In many uses of the microscope, it may not be necessary to use objectives of high N.A. because the details of the specimen can be readily resolved with lower N.A. objectives. This may be important because high magnification, high N.A. objectives are accompanied by very shallow depth of field and short working distances from the specimen. (Depth of field is the vertical distance above and below the actual plane of the focused specimen that still is in satisfactory focus). Thus in specimens where resolution is less critical and magnification can be lower, it may be better to use objectives of more modest N.A. to gain more depth of field and deeper distances between the front of the objective and the specimen.

For full realization of the aperture of the objective, it should be matched (but not exceeded) by the aperture of the condenser. In practice, the partial closing of the aperture iris diaphragm of the condenser reduces the working aperture of the system; the effect is to somewhat reduce resolution but to increase contrast for greater visibility.

There are numerous light sources available to illuminate microscopes, both for routine observation and critical photomicrography. A most common light source, because of its low cost and long life, is a 50 or 100 watt tungsten halogen lamp at the base of the microscope. A tungsten-halogen lamp emits a continuous spectrum of light centered at 3200 K (when set at a lamp voltage of +9 volts), which is then passed through a collector and field lens before being reflected into the substage condenser and onto the specimen.

In a typical microscope setup, the lamp housing (illumination source) is attached to the base and projects light through several lenses and then through the substage condenser after being reflected by a mirror in the microscope base. The light source itself should be precentered or centerable to the optical axis of the microscope. Light emitted from the tungsten-halogen lamp filament first passes through the collector lens located close to the lamp housing, and then through a second lens that is closer to the field diaphragm. Often, a sintered or frosted glass filter is placed between the lamp and the collector lens to diffuse the light and ensure an even intensity of illumination. In practice, the image of the lamp filament is focused onto the front focal plane of the condenser while the diffuser glass is temporarily removed from the light path. The focal length of the collector lens must be carefully matched to the lamp filament dimensions to ensure that a filament image of the appropriate size is projected into the condenser aperture. For proper Köhler illumination, the image of the filament should completely fill the condenser aperture.

The second lens in the light path is called the field lens, which is responsible for bringing the image of the filament into focus at the plane of the substage condenser aperture diaphragm. Focused light leaving the field lens is reflected by a mirror (positioned at a 45-degree angle to the light path) through the field diaphragm and into the substage condenser. The field diaphragm serves as a virtual source of light for the microscope and its image is focused by the condenser onto the specimen plane. Optical designs for the arrangement of these elements may vary by microscope manufacturer, but the field diaphragm should be positioned at a sufficient distance from the field lens to eliminate dust and lens imperfections from being imaged in the plane of the specimen.

The field diaphragm in the base of the microscope controls only the width of the bundle of light rays reaching the condenser—it does not affect the optical resolution, numerical aperture, or the intensity of illumination. Proper adjustment of the field diaphragm (i.e., centered in the optical path and opened so as to lie just outside of the field of view) is important for preventing glare than can reduce contrast in the observed image. The elimination of excess light is particularly important when attempting to image samples with inherently low contrast. When the field diaphragm is opened too far, scattered light originating from the specimen and light reflected at oblique angles from optical surfaces can act to degrade image quality.

Figure 2:
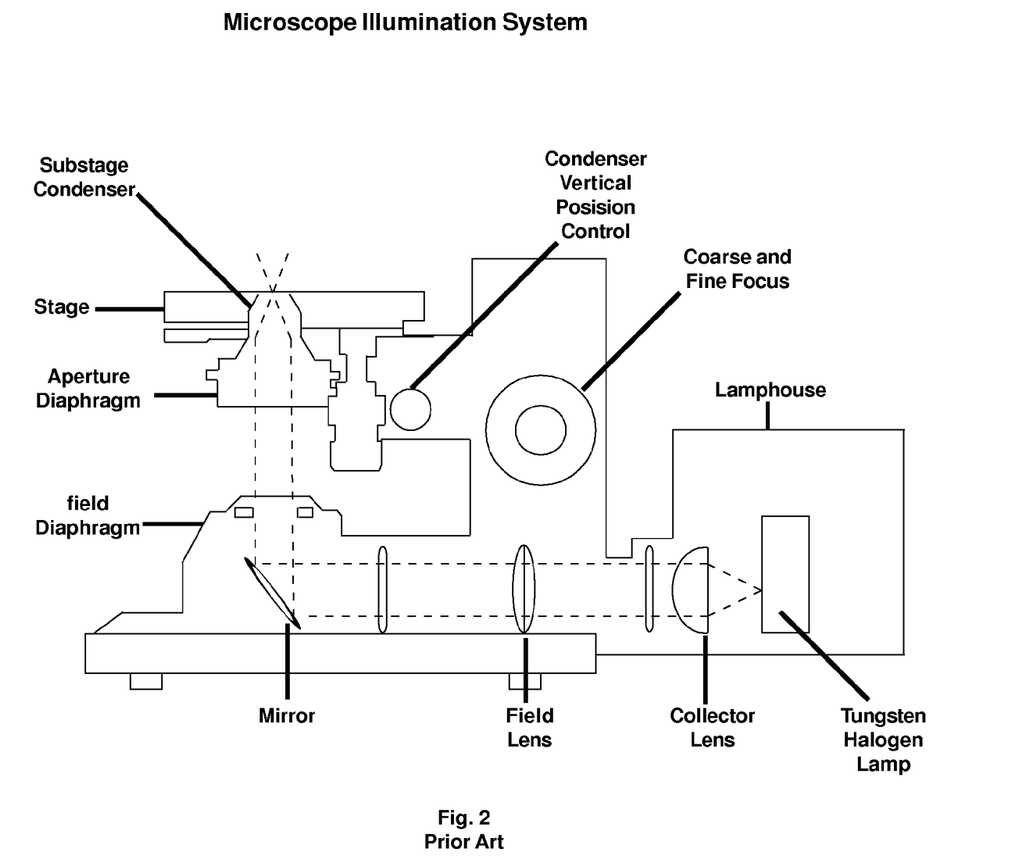
FIG. 2 shows a typical microscope illumination system according to the prior art.

The substage condenser is typically mounted directly beneath the microscope stage in a bracket that can be raised or lowered independently of the stage by rotating a knurled knob, as illustrated in FIG. 2. The aperture diaphragm is opened and closed with either a swinging arm, a lever, or by rotating a collar on the condenser housing. It should be noted that correct adjustment of the substage condenser is probably the most critical aspect of achieving proper Köhler illumination. Condenser misalignment and improperly adjusted condenser aperture diaphragms are a main source of image degradation and poor quality photomicrography.

When properly adjusted, light from the condenser will fill the back focal plane of the objective with image-forming light by projecting a cone of light to illuminate the field of view. The condenser aperture diaphragm is responsible for controlling the angle of the illuminating light cone and, consequently, the numerical aperture of the condenser. Condenser light cone shapes are also a function of the degree of correction for optical aberration.

It is important to note, with respect to the size and shape of condenser light cones, that reducing the size of the field diaphragm only serves to slightly decrease the size of the lower portions of the light cones. The angle and numerical aperture of the light cone remains essentially unchanged with reduction in field diaphragm size. The intensity of illumination should not be controlled through opening and closing the condenser aperture diaphragm, nor by shifting the condenser axially with respect to the optical center of the microscope. Illumination intensity should only be controlled through the use of neutral density filters placed into the light path or by reducing voltage to the lamp (although the latter is not usually recommended, especially for photomicrography). Brightness of the illumination can then be easily controlled by adding or removing neutral density filters.

The size of the substage condenser aperture diaphragm should not only coincide with the desired numerical aperture, but also the quality of the resulting image should be considered. Generally, the aperture diaphragm should be adjusted to provide sufficient image contrast without being closed to the point of introducing a loss of resolution and detail. Refractive index and inherent specimen contrast are very important in determining the size of the aperture diaphragm. In general, the diaphragm should be set to a position that allows 60 to 90 percent of the entire light disc size (visible in the eye tube after removal of the eyepiece or with a Bertrand lens), although this may vary with extremes in specimen contrast.

Where the aperture diaphragm is set to a position in which the numerical aperture of the condenser and objective are nearly equal, much of the fine specimen detail is visible, although there remains a considerable amount of scattering and glare. The image is also significantly brighter than its counterparts, which were made with a smaller setting of the aperture diaphragm. At a condenser aperture size that produces a numerical aperture approximately 70 percent that of the objective, glare is reduced, the image is very sharp, and fine image detail is present without significant diffraction artifacts. When the diaphragm is closed to the smallest setting at about 25 percent of the objective numerical aperture, fine image details become obscured with diffraction artifacts and refraction phenomena. The image also takes on a darker overall cast that produces shifts in the color hues of the specimen.

From the above discussion it is evident that the condenser aperture diaphragm should be set to a position that will provide a compromise mixture of direct and deviated light that depends, to a large degree, on the absorption, diffraction, and refraction characteristics of the specimen. This must be accomplished without overwhelming the image with artifacts that obscure detail and present erroneous enhancement of contrast. The amount of image detail and contrast necessary to produce the best photomicrograph is also dependent upon refractive index, optical characteristics and other specimen-dependent parameters.

When the aperture diaphragm is erroneously closed too far, deviated light begins to obscure direct illuminating rays, resulting in diffraction artifacts that cause visible fringes, banding, and/or pattern formation in photomicrographs. Other problems, such as refraction phenomena, can also produce apparent structures in an image that are not real. Alternatively, opening the condenser aperture too wide causes unwanted glare and light scattering from the specimen and optical surfaces within the microscope. This leads to a significant loss of contrast and washing out of image detail. The correct setting will vary from specimen to specimen, and the experienced microscopist will soon learn to accurately adjust the condenser aperture diaphragm (and numerical aperture of the system) by observing the image without having to view the diaphragm in the back focal plane of the objective. In fact, many microscopists believe that critical reduction of the numerical aperture of the microscope system to optimize image quality is the single most important step in photomicrography.

The illumination system of the microscope, when adjusted for proper Köhler illumination, must satisfy several requirements. The illuminated area of the specimen plane must be at least as large as the field of view for any given objective. Also, the light must be of uniform intensity and the numerical aperture must vary from a maximum (equal to that of the objective) to a minimum value that will depend upon the optical characteristics of the specimen.

Modern microscopes are equipped with specialized substage condensers that have a swing-out lens, which can be removed from the optical path for use with lower power objectives (2× through 5×). This changes the performance of the remaining components in the light path, and some adjustment is necessary to achieve the best illumination conditions. The field diaphragm can no longer be used for alignment and centering of the substage condenser and is now ineffective in limiting the area of the specimen under illumination. Also, much of the unwanted glare once removed by the field diaphragm is reduced because the top lens of the condenser produces a light cone having a much lower numerical aperture, allowing light rays to pass through the specimen at much lower angles. Most importantly, the optical conditions for Köhler illumination no longer apply.

Alignment of the microscope optical components and the establishment of Köhler illumination conditions is generally undertaken at a higher (10×) magnification before removing the swing-out condenser lens for work at lower (5× and below) magnifications. The height of the condenser should then not be changed. Condenser performance is radically changed when the swing-out lens is removed. The image of the lamp filament is no longer formed in the aperture diaphragm, which ceases to control the numerical aperture of the condenser and the illumination system. In fact, the aperture diaphragm should be opened completely to avoid vignetting, a gradual fading of light at the edges of the viewfield.

Figure 3:
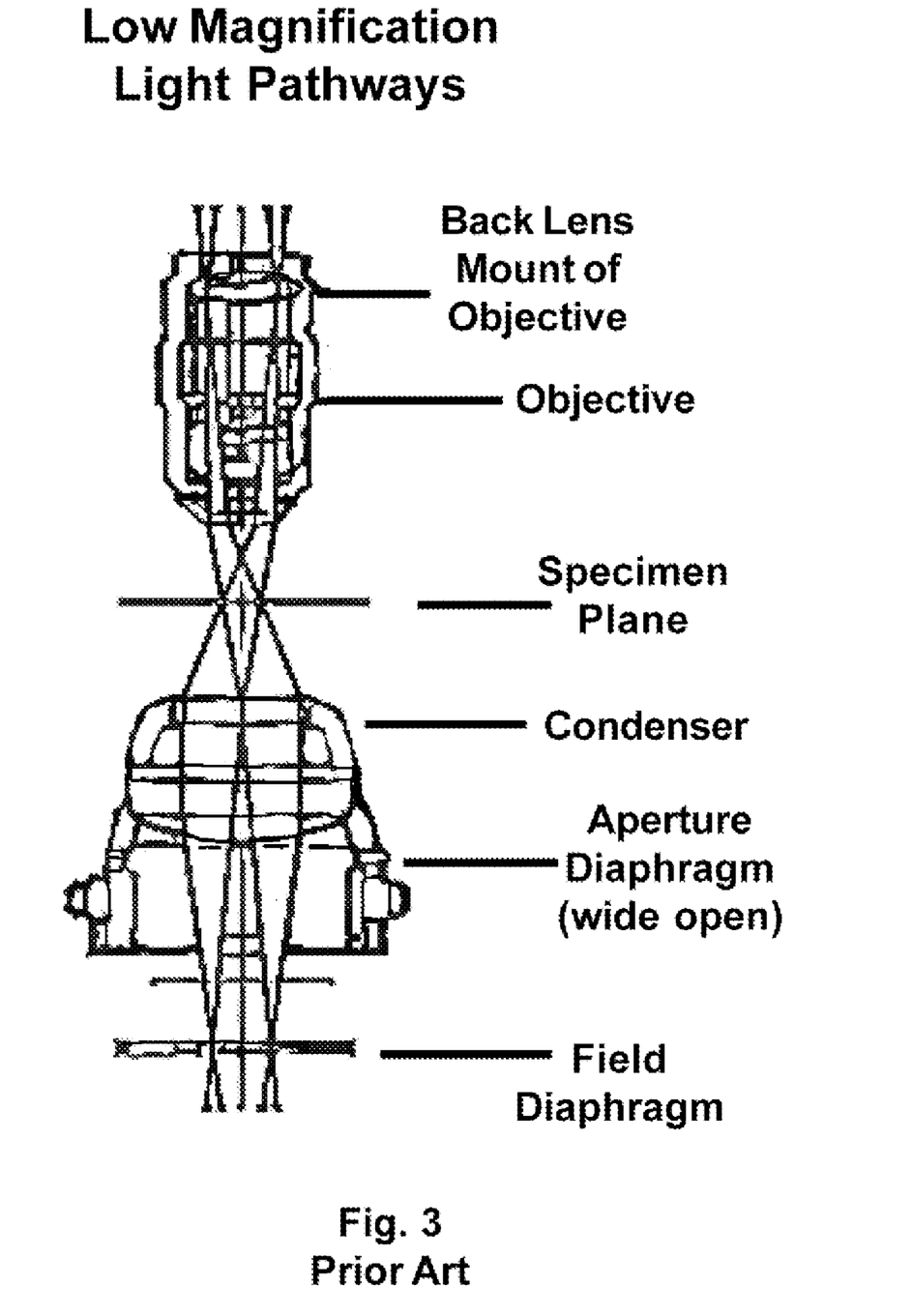
FIG. 3 shows a set of conjugate image planes of the illumination system according to the prior art.

The modified optical pathway for transmitted light in a low power microscope system is illustrated in FIG. 3. The field diaphragm is now positioned in the correct plane to act as an aperture stop to control the numerical aperture and the size and shape of the light cone for the illuminating and image-forming light rays passing through the condenser. The specimen plane is fully illuminated with equiangular cones (as in Köhler illumination), however the filament is now imaged at the back lens mount of the objective instead of the back focal plane.

It is important to note that the image of the field diaphragm is no longer formed in the specimen plane, although the overall intensity of illumination is still uniform within the field of view, provided the lamp condenser lens is slightly diffusing (chemically etched) or frosted.

Contrast adjustment in low magnification microscopy is similar to the procedure using high magnification objectives. When the field diaphragm is wide open (greater than 80 percent), specimen details are washed out and a significant amount of scattering and glare is present. Closing the field diaphragm to a position between 50 and 80 percent will yield the best compromise on specimen contrast and depth of field. Objectives designed for low magnification are significantly simpler in design than their higher magnification counterparts. This is due to the smaller angles of illuminating light cones produced by low magnification condensers, which require objectives of lower numerical aperture.

With this background, we now proceed to discuss how the present invention advances the field of microscopic illuminators.

SUMMARY OF THE INVENTION

The present invention provides a broad field macro and micro illumination system having a fixed height specimen stage, a focusable condenser, and a condenser field diaphragm. Preferably, a fiber optic light source is employed, although other suitable light sources may be employed.

The preferred system according to the present invention is designed to accommodate a wide range of magnifications, from low to medium, e.g., objectives having 1× (or even lower) to 10× power, while at the same time allowing substantial control of the numerical aperture of the light reaching the specimen.

In general, the illuminator according to a preferred embodiment of the present invention is intended to be suitable for relatively large working distances between objective and subject, and thus does not particularly address very high numeric aperture illuminators. However, it is apparently that the teachings according to the present invention may be employed for such embodiments.

According to one aspect of the present invention, a single illuminator, is continuously variable between critical (source focused at subject plane) illumination, also known as Nelsonian illumination, and Köhler-type illumination (source focused at the condenser field aperture). Preferably, it is not required to alter the illumination conditions. Rather, it is preferred that the focal plane of the condenser be axially adjustable.

A further aspect of the present invention provides an adjustable angle of illumination from the condenser with respect to the optical axis of the objective. This provides a pseudo-enhancement of the numeric aperture (due to the increased angle of illumination) and/or a dark-field (side illuminated) mode. Thus, by inclining the optical axis of the condenser within the capture range of the objective, light from the condenser will be directed along the light path of the system, resulting in light field observing conditions. However, due to the inclined axis, neither Nelsonian nor Köhler illuminations strictly apply, since the focal planes of the condenser and objective are inclined, leading to a spatial variation on illumination relationships. As the illumination axis of the condenser increases, it will lie outside cone of the objective, and dark-field illumination conditions will occur. Under such conditions, only light which is deflected by the subject will be observed.

A preferred embodiment of the invention employs a fiber optic illuminator having a composite source with both a modeling light (e.g., white-balanced continuous illumination) and xenon flash, for photographic purposes. In this case, the modeling illumination is particularly for composing the image, for example adjusting the focus, illuminator, specimen positioning, etc. While images may be captured (and indeed, it is preferred that image composition be performed using a real-time imaging mode from the electronic imager), preferably, the intended image to be preserved is captured using the xenon flash, which has superior white balance and very high intensity. This, in turn, permits apertures to be closed, providing a high depth of field.

According to one embodiment, a through-the-lens (TTL) metering system is employed to control the flash illumination duration, to control exposure of the image.

For higher magnifications (objective magnifications above 5×), light emitted from a fiber optic illuminator (or other illumination source) is passed through an intensity iris diaphragm and a diffuser filter, and directed toward an iris diaphragm at the field diaphragm position. The diffuser homogenizes the light from the fiber optic conduit, which otherwise would present as an array of sources superimposed on the subject image during critical illumination. The diffuser is mounted to permit substitution of other filters at this position of the optical path. The intensity iris is placed ahead of the diffuser, just behind the fiber optic conduit exit aperture, such that changes in the apparent size of the light source are immaterial. Alternately, neutral density filters (or other types of filters) may be inserted, but the iris provides a convenient and useful method of intensity control.

As the condenser field diaphragm, located on the opposite side of the diffuser from the light source, is closed, it reduces the N.A. of the light received by the condenser cell. The condenser cell is adjustable to permit focusing of the diffuser or the condenser field diaphragm at the subject plane, or intermediate conditions. The adjustment range may also extend beyond these two conditions. Typically, the condenser cell is axially repositioned; however, a more complex adjustment is possible.

At low magnifications (below 5× objective) the intensity iris diaphragm is adjusted to be relatively open, and the condenser cell is moved to project the focus of the diffuser onto the subject plane, with a conjugate focal plane at the back lens mount of the objective. The intensity iris diaphragm is opened to ensure uniform brightness across the field, which in this case is substantially larger than with high magnification conditions, and thus use of the intensity iris diaphragm may result in light fall-off at the edges of the field. Likewise, the condenser field diaphragm is not closer to the condenser than the focal plane, and should be relatively open, to avoid vignetting. In accordance with the present arrangement, the condenser is moved closer or further from the subject with respect to the deflecting angle mirror, effectively repositioning the focus of the light source.

The iris adjustments in these cases are less critical than in Köhler type illumination, and lack the ability to greatly reduce the NA. This arrangement is typical for macro work. On the other hand, under these illumination conditions, uniform broad field illumination conditions are obtained, with critical source illumination characteristics.

This illuminator therefore permits a common illuminator to achieve near-Köhler illumination conditions, while also permitting a wide aperture, critical illumination system for lower magnification conditions.

By having a single illuminator for both high (>5× objective) and low (<5× objective) magnification, it is possible to employ a single illumination scheme for transmitted light on a broad range of low to medium magnification conditions.

The ability to adjust the mirror angle provides further flexibility, both to increase the pseudo-numeric aperture of the illuminator for small displacements, and to provide dark field illumination for larger displacements.

A mirror slide control is also provided, which is useful to assure that the illumination is centered on the subject; otherwise, a change in the angle of the mirror would displace the illumination from the subject center. A small condenser lens zoom control may be provided to adjust the focal length of the condenser cell, should this be necessary to compensate for changes of distances within the illumination path.

The present invention is particularly advantageous for use with variable numerical aperture optical systems, i.e., zoom microscopes. The tilting mirror changes the angle of light allowing dark field illumination or bright field and/or points in between. In doing so, tilting the mirror changes the angle of the cone of light so that multiple combinations or illumination can be achieved. It is noted that, in normal microscopes, the field diaphragm cannot be closed down beyond a certain point because of significant light loss. On the other hand, the present invention preferably employs a xenon flash illuminator for exposure, i.e. a Fodis® ML 1000 high output illuminator, permitting a decrease in the field diaphragm aperture to a much smaller point, in order to further decrease the NA of the light going to the condenser far beyond normal illumination conditions. See, U.S. Pat. Nos. 6,402,358 and 7,030,571, expressly incorporated herein by reference.

The illuminator according to the present invention has also been used for cross polarization purposes. By replacing or supplementing the diffuser filter with a polarizing filter oriented vertically, and a duplicate polarizer in the lens system beyond the objective in a horizontal orientation, maximum polarization can be achieved. Any neutral density ultraviolet or colored filter may be used in place of or in addition to the diffuser filter for added flexibility and control.

It is therefore an object of the present invention to provide an illuminator system suitable for both critical source illumination and Köhler-type illumination without substantially altering the elements within the optical path, preferably providing the change over a continuous range of adjustment. Further, the illuminator preferably employs a fiber optic illuminator providing both incandescent continuous illumination and stroboscopic illumination.

These and other objects will become apparent from a review of the Drawings and the Detailed Description of the Preferred Embodiments. For a full understanding of the present invention, reference should now be made to the following detailed description of the preferred embodiments of the invention as illustrated in the accompanying drawings.

BRIEF DESCRIPTION OF THE DRAWINGS

A preferred embodiment of the invention will now be described by way of the figures in the drawings, in which.

DETAILED DESCRIPTION OF THE PREFERRED EMBODIMENTS

Figure 4:
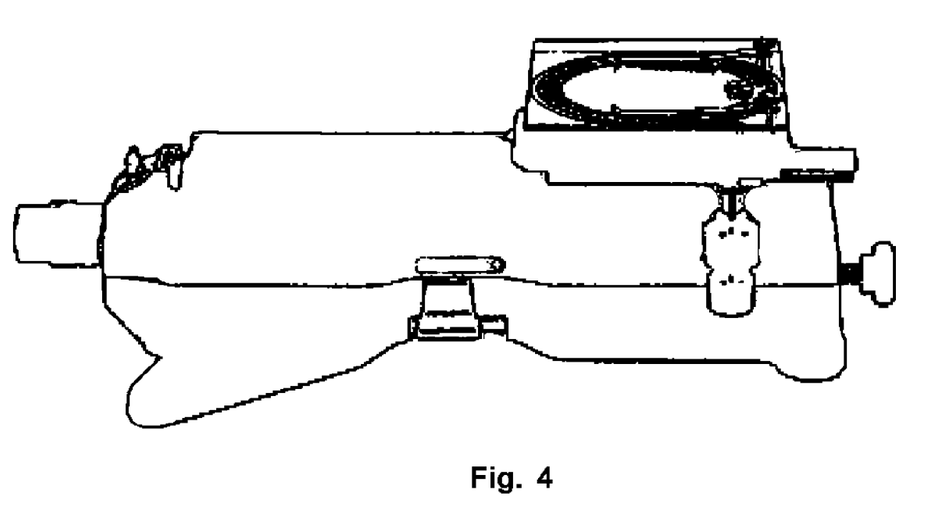
FIG. 4 shows a top perspective view of a microscopic illuminator according to a preferred embodiment of the present invention.
Figure 5:
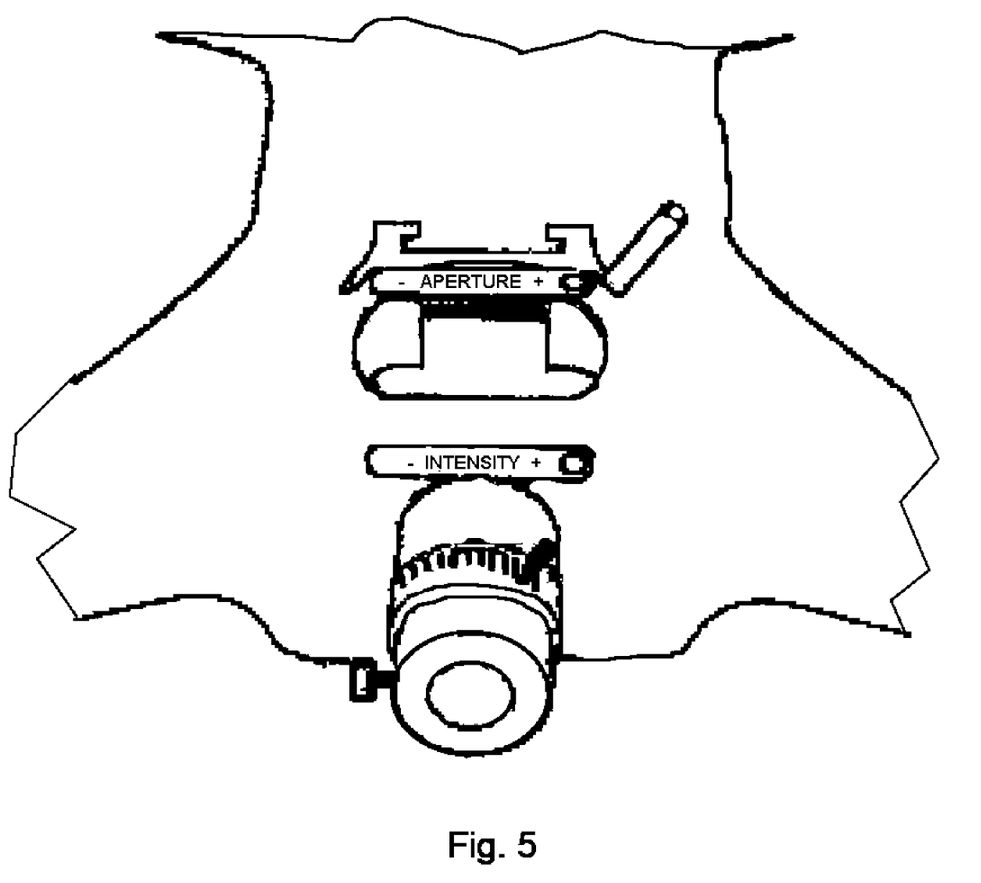
FIG. 5 shows a side perspective view of the fiber optic coupler of the embodiment shown in FIG. 4.
Figure 6:
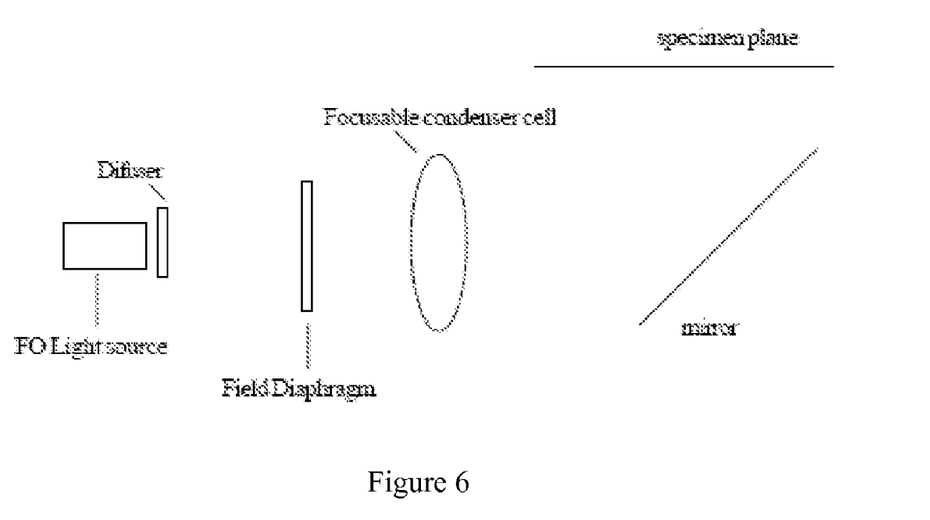
FIG. 6 shows a schematic view of the components of the optical path of the embodiment according to FIG. 4.
Figure 7A:
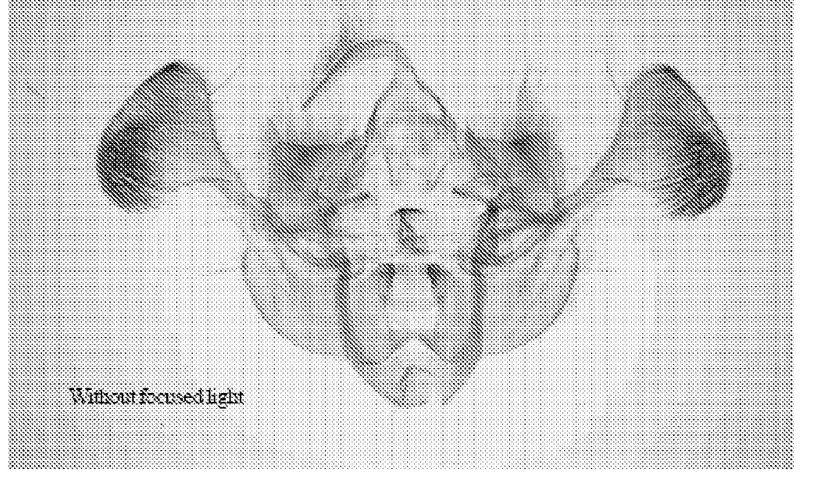
FIG. 7A shows a photograph of the genitalia of a male tallywacker moth taken with the microscopic illuminator system according to FIG. 4, with unfocused light.
Figure 7B:
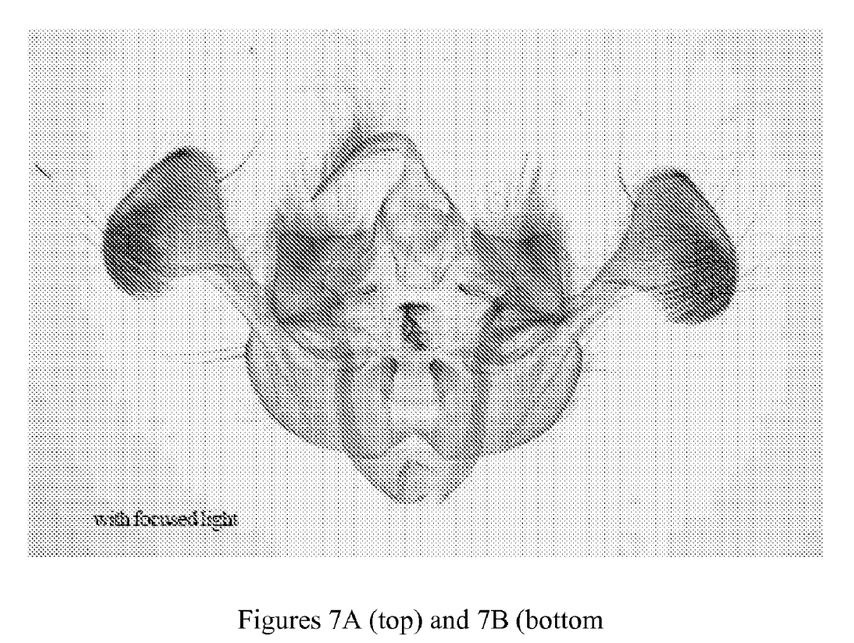
FIG. 7B shows a photograph of the genitalia of a male tallywacker moth taken with the microscopic illuminator system according to FIG. 4, with focused light.

FIG. 4 shows a top perspective view of a preferred embodiment according to the present invention.

A fiber optic coupler provides both modeling illumination and stroboscopic illumination from a remote device, such as the Fodis® ML-1000 stroboscopic illuminator. An intensity iris diaphragm, immediately after the exit aperture from the fiber optic conduit controls the diameter of the light from the fiber optic source, which is then diffused by the diffuser placed a short distance from the iris.

The light passing through the diffuser (or other filter(s)), in turn, passes through a field iris diaphragm, which is placed near the conjugate image plane of the specimen through the condenser cell, in at least one position of adjustment. The condenser cell then (in this position) images the field diaphragm plane on the specimen at the subject plane, deflected by using an angle mirror having a nominal angle of 45 degrees to vertical path, but adjustable in both angle and displacement by means of a tilt and slide control. The control permits adjustment of the angle and position of illumination of the subject by the source.

The condenser cell is movable along the optical axis, and thus has an adjustable focus, by means of the field lens assembly adjustment. Not shown in this embodiment, further optical adjustments of this assembly are possible, as appropriate, for example for color and/or planarity adjustment. Likewise, it may also be possible to adjust the angle of the focal plane, to compensate for the angle of illumination.

In operation, the system is used in two modes within a continuous range of adjustment; a first mode in which the field diaphragm is at the conjugate focal plane of the subject, and is adjustable to alter the effective numeric aperture of the illuminator, with the condenser positioned such that the field diaphragm is at the conjugate image plane of the subject, and a second mode in which the field diaphragm is left wide open (i.e., generally non-interfering with the light path), and the condenser is focusable, permitting projection of the diffuser filter at the conjugate focal plane of the subject. The condenser cell may also be adjusted for other relationships.

Not shown in the figures, an aperture diaphragm may also be provided to adjust the size of the light cone without adjusting the numeric aperture.

In contrast to traditional microscope illuminators designed for high magnifications (>20× objective), the system according to the present invention is designed for lower objective magnifications, i.e., 1×-10×. The condenser light cone is therefore narrower, and relatively further away from the subject than typical for a higher magnification system.

At lower magnification, a bigger concern than achieving a large numeric aperture of the system is the ability to illuminate the entire range of the subject. For example, when using a 1× objective, a 1 cm diameter subject (with a ½.5" imager) requires a 1 cm diameter illumination range, while at 10× requires a 0.1 cm (1 mm) diameter illumination range.

There has thus been shown and described novel illuminators and novel aspects of microscope illumination systems, which fulfill all the objects and advantages sought therefore. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A microscope illuminator system providing at least two illumination modes, the illuminator comprising an illumination source, a condenser lens system, a condenser field iris diaphragm, a diffuser, and a second iris diaphragm, the diffuser being located between the illumination source and the condenser lens system, the condenser field iris diaphragm being located proximal to the condenser lens system with respect to the diffuser, and the second iris diaphragm being located distal to the condenser lens system with respect to the diffuser, the illumination system having a subject image plane and being reconfigurable between said at least first and second illumination modes with substantially the same elements by displacement of at least one lens within an optical path, a first mode being adapted to achieve critical source illumination and a second mode being adapted to achieve Köhler-type illumination.

2. The microscope illuminator system according to claim 1, wherein an image of the illumination source is projected at the subject image plane in the first mode.

3. The microscope illuminator system according to claim 1, wherein an image of the condenser filed diaphragm is projected at the subject image plane in the second mode.

4. The microscope illuminator system according to claim 1, wherein the optical path is continually adjustable between the first mode and the second mode.

5. The microscope illuminator system according to claim 1, wherein the illumination source comprises a fiber optic conduit.

6. The microscope illuminator system according to claim 1, wherein the illumination source comprises a continuous illumination source with a first intensity and a discontinuous illumination source having a second intensity higher than the first intensity.

7. The microscope illuminator system according to claim 1, wherein an image of the illumination source is projected at the subject image plane in the first mode and an image of the condenser filed diaphragm is projected at the subject image plane in the second mode.

8. The microscope illuminator system according to claim 1, further comprising a mirror intersecting the optical path, said mirror having an adjustable inclination with respect to the optical path.

9. The microscope illuminator system according to claim 8, wherein said mirror is adjustable to an angle in at least one operative mode wherein and optical axis of the illumination source is not substantially aligned with an optical axis of a microscope objective being illuminated, to thereby at least one of increase a pseudo-numeric aperture of the illuminator or provide dark field illumination.

10. A microscope illuminator system, comprising:
a light source;
a diffuser;
a condenser lens system;
a condenser field iris diaphragm;
a second iris adapted to adjust light source intensity; and
a subject image plane,
wherein the condenser lens system is adjustable between a first position wherein the light source is at a conjugate focal plane of the subject image plane, and a second position wherein field iris diaphragm is at a conjugate focal plane of the subject image plane, and
wherein the condenser field iris diaphragm is placed proximal to the condenser lens system with respect to the diffuser, and the second iris diaphragm is placed distal to the condenser lens system with respect to the diffuser, the condenser field iris diaphragm and the second iris diaphragm being adjustable in the first position to provide optimized critical source illumination and in the second position to provide optimized Köhler-type illumination.

11. The microscope illuminator system according to claim 10, wherein the condenser lens system is continuously adjustable between the first position and the second position.

12. The microscope illuminator system according to claim 10, further comprising a mirror intersecting an optical axis of the condenser lens system, said mirror having an adjustable angle to thereby adjust an inclination of the optical axis of the condenser lens system and an optical axis of a objective lens of a microscope over an operative range comprising a coaxial inclination and a substantially non-coaxial inclination.

13. A microscope illumination method, comprising:
providing an illumination system compositing a light source, a condenser lens system, a condenser field iris diaphragm, and a light source intensity adjustment, the illumination system having a subject image plane;
adjusting the illumination system whereby the condenser lens system is in a first position wherein the light source is at a conjugate focal plane of the subject image plane; and
adjusting the illumination system whereby the condenser lens system is in a second position wherein field iris diaphragm is at a conjugate focal plane of the subject image plane
wherein the illuminator system further comprising a diffuser between the light source and the condenser lens system, wherein the condenser field iris diaphragm is placed proximal to the condenser lens system with respect to the diffuser, and a second iris diaphragm placed distal to the condenser lens system with respect to the diffuser, further comprising the steps of adjusting the condenser field iris diaphragm and the second iris diaphragm in the first position provides optimized critical source illumination and in the second position provides optimized Köhler-type illumination.

14. The method according to claim 13, further comprising the step of continually adjusting the illumination system between the first position and the second position.

15. The method according to claim 13, wherein the light source comprises a fiber optic conduit.

16. The method according to claim 13, wherein the light source comprises a continuous illumination source with a first intensity and a discontinuous illumination source having a second intensity higher than the first intensity.

17. The method according to claim 13, wherein the illuminator system further comprises a fiber optic illuminator comprising an array of illumination sources producing superposed illumination at the subject image plane.

18. The method according to claim 13, the illumination system further comprising a mirror intersecting an optical axis from the light source through the condenser lens system, further comprising the step of adjusting an inclination of the mirror with respect to the optical axis.

19. The method according to claim 18, further comprising the steps of imaging an object at the subject image plane with a microscope having an optical axis, and inclining the mirror to an angle such that the optical axis of the illumination system is not parallel to the optical axis of the microscope.

20. The method according to claim 19, wherein the microscope has an objective with a capture range, and an object at the subject image plane is illuminated by the illumination system with the mirror inclined such that the optical axis of the illumination system is outside of the capture range, to thereby provide dark field illumination.

* * * * *